US006455152B1

(12) United States Patent
DiZio et al.

(10) Patent No.: US 6,455,152 B1
(45) Date of Patent: Sep. 24, 2002

(54) ADHESIVE COATING METHOD AND ADHESIVE COATED ARTICLE

(75) Inventors: James P. DiZio, Saint Paul; Douglas E. Weiss, Golden Valley; Bruce A. Sventek, Saint Paul; Charles G. Carter, Oakdale, all of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/386,180

(22) Filed: Aug. 31, 1999

(51) Int. Cl.[7] ............................................. B23B 15/04
(52) U.S. Cl. ..................... 428/345; 428/343; 428/349; 428/352; 428/353; 428/355 R; 428/355 AC; 428/355 EN; 428/355 BL; 428/355 N
(58) Field of Search ........................ 427/509; 428/345, 428/343, 353, 352, 349, 355 R, 355 AC, 355 EN, 355 BL, 355 N; 264/293; 156/273.3, 273.5, 567, 568

(56) References Cited

U.S. PATENT DOCUMENTS

| 4,203,798 | A | | 5/1980 | Yamashita ................... 156/567 |
| 4,246,297 | A | | 1/1981 | Nablo et al. .................. 427/44 |
| 4,521,445 | A | | 6/1985 | Nablo et al. .................. 427/44 |
| 5,266,400 | A | * | 11/1993 | Yarusso et al. ............. 428/345 |
| 5,344,681 | A | | 9/1994 | Calhoun et al. .............. 428/42 |
| 5,650,215 | A | * | 7/1997 | Mazurel et al. ............. 428/156 |
| 5,773,080 | A | | 6/1998 | Simmons et al. ........ 427/208.6 |
| 5,897,930 | A | | 4/1999 | Calhoun et al. ........... 428/41.8 |
| 6,103,316 | A | * | 8/2000 | Tran et al. ............... 427/208.4 |
| 6,123,890 | A | * | 9/2000 | Mazurek et al. ............. 264/293 |
| 6,326,072 | B1 | * | 12/2001 | Ojeda et al. ................. 428/172 |

FOREIGN PATENT DOCUMENTS

| WO | WO 90/15673 | 12/1990 | ............ B05D/3/12 |
| WO | WO 95/26281 | 10/1995 | |
| WO | WO 98/24859 | 6/1998 | ............... C09J/4/00 |
| WO | WO 99/17891 | 4/1999 | ............ B05D/1/02 |

OTHER PUBLICATIONS

Becker et al., "Accelerator Requirements for Electron Beam Processing", *Radiat. Phys. Chem.*, vol. 14, pp. 353–375, Pergamon Press Ltd., 1979.
Karmann, "Crosslinking and Curing of Coatings by means of Electron–Accelerators", 7th Munich Adhesive and Processing Seminar, 1982, Finishing and Printing with Chemical and Radiation–Chemical Curing Systems.
Karmann, "Determination of Dosage and Penetration Depth of the Radiation by means of an Electron–Accelerator for the Practice".
Ohta et al., "New Process for Curing of Electron–Beam Curable Pressure–Sensitive Adhesives", *Radiat. Phys. Chem.*, vol. 35, Nos. 1–3, p. 81, Pergamon Press 1990.
Fletcher, "Low Voltage (120 kV) Electron Beam Systems", RadTech '94 North America Proceedings, vol. 1, p. 72 (1994).

* cited by examiner

*Primary Examiner*—James J. Seidleck
*Assistant Examiner*—Sanza L McClendon
(74) *Attorney, Agent, or Firm*—Dean M. Harts; Douglas B. Little

(57) ABSTRACT

Disclosed is a method for making a substrate coated with an adhesive, comprising applying an electron beam modifiable adhesive layer onto a repeatably reusable transfer surface, irradiating the adhesive layer with an electron beam to chemically modify the adhesive layer, and transferring the irradiated adhesive layer to a substrate. Also disclosed is an adhesive coated web, comprising a substrate having at least one component susceptible to electron beam radiation degradation having no electron beam radiation modification and an adhesive layer having an electron beam modified composition and having no chemical, thermal, or ultraviolet crosslinking agent.

8 Claims, 3 Drawing Sheets

ADHESIVE COATING METHOD AND ADHESIVE COATED ARTICLE

TECHNICAL FIELD

This invention relates to a method for making an article having an irradiated adhesive on a radiation degradable substrate where the substrate has no substantial degradation. More specifically this invention relates to a drum transfer method for adhesive irradiation by electron beam.

BACKGROUND

Adhesives, including pressure-sensitive adhesives, and heat activatable adhesives are well known in the art for bonding to a variety of materials such as metals, painted surfaces, plastics, and the like. Adhesives are designed to meet various requirements by balancing their viscous and elastic properties to result in a balance of shear, peel, and tack properties. Pressure-sensitive adhesives generally adhere with light pressure and are tacky at the use temperature. Heat activatable adhesives may adhere with light pressure and be slightly tacky at the use temperature, or may require elevated temperatures or pressures to adhere to another material.

Crosslinking occurs when a polymer, that may be of a low molecular weight, is subjected to ionizing radiation that links the polymer chains together and increases the effective molecular weight. Adhesives can be crosslinked to obtain the desired balance of properties.

DISCLOSURE OF INVENTION

Briefly, the present invention provides a method for making a substrate coated with an adhesive, comprising: applying an electron beam modifiable adhesive layer onto a repeatably reusable transfer surface; irradiating the adhesive layer with an electron beam to chemically modify the adhesive layer; and transferring the irradiated adhesive layer to a substrate. In one embodiment, the adhesive is applied to a release surface before applying the adhesive to the repeatably reusable transfer surface.

In another aspect, the present invention provides an adhesive coated web, comprising: a substrate having at least one component susceptible to electron beam radiation degradation selected from the group consisting of cellulose-based non-woven fabrics, cellulose-based woven fabrics, paper, polyisobutylene films, polypropylene films, polypropylene-based nonwovens, polytetrafluoroethylene films, vinyl films, and combinations thereof, having no electron beam radiation modification; and an adhesive layer attached to the substrate and in contact with a radiation degradable component of the substrate, the adhesive having an electron beam modified composition and containing no substantial quantity of chemical, thermal, or ultraviolet crosslinking agent.

The adhesive is selected from the group consisting of acrylics, natural rubbers, polybutadienes, polyisoprenes, styrene/butadiene copolymers, styrene/isoprene copolymers, and silicones.

This invention also provides a new adhesive coated web having a substrate having at least one component susceptible to electron beam radiation degradation having no electron beam radiation modification, and an adhesive layer having an electron beam modified composition wherein the electron beam modified adhesive layer has an electron beam modification profile selected from the group consisting of an increasing degree of crosslinking through the adhesive thickness from a surface toward the substrate, a substantially uniform degree of crosslinking through the adhesive thickness, a decreasing degree of crosslinking through the adhesive thickness, and a peak level of crosslinking within the adhesive between the surface and the substrate; and wherein the resulting construction flexibility is not substantially different from the construction flexibility of a similar adhesive coated web having had no electron beam modification. In essence, any possible electron beam modification profile can be achieved with the present invention without degrading the substrate.

Another embodiment of the present invention includes a new adhesive coated web having an electron beam modified adhesive layer and a substrate that has a different release characteristic on each major surface.

As used herein:

"radiation degradable" describes a material the durability or flexibility of which decreases due to exposure to electron beam radiation at a dose and accelerating potential needed to achieve a desired modification of an electron beam modifiable adhesive layer;

"electron beam modifiable" means susceptible to chemical changes resulting from electron beam irradiation, for example forming free radicals, chemically activating a skin layer, crosslinking, curing, increasing or decreasing the molecular weight of a polymer, polymerizing oligomers or monomers, and the like; thus, an electron beam modification of a material would include changes such as, for example, embrittlement, crazing, cracking, formation of a skin layer, bond sission, and formation of degradation species such as oxides;

"structured surface" means a surface having a multiplicity of recessed structures, features or convolutions made by any process, including electroforming, embossing, etching, molding, machining, or sandblasting, the average depth of which is between 1 and 2000 micrometers ($\mu$m) over the majority of its area, but preferably over 75% or more of its area and more preferably over 90% or more of its area, which may or may not also comprise occasional larger recessed structures.

It is an advantage of the present invention to provide a method of making electron beam modified adhesive layers on radiation vulnerable substrates while not exposing the substrate to electron beam energy. This permits manufacturing constructions having the advantages inherent in the electron beam process, with various electron beam modification profiles, without the adverse effects on the substrate associated with electron beam energy, and without the use of a carrier material.

DETAILED DESCRIPTION

The present invention provides a method for making a substrate coated with an adhesive, comprising: applying an electron beam modifiable adhesive layer onto a repeatably reusable transfer surface; irradiating the adhesive layer with an electron beam to chemically modify the adhesive layer; and transferring the irradiated adhesive layer to a substrate.

Figure 1:
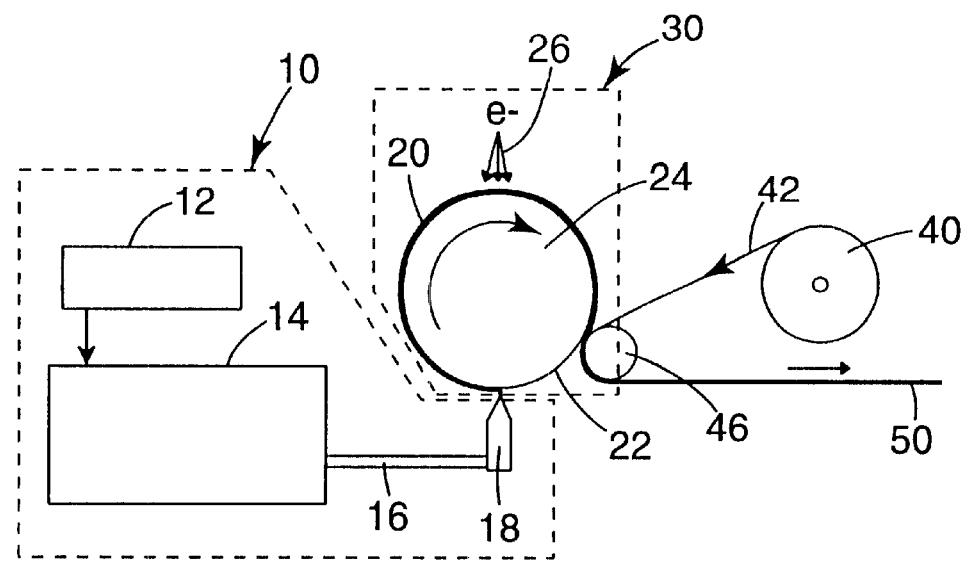
FIG. 1 is a schematic of one embodiment of a method of the present invention.

Referring now to FIG. 1, adhesive coating station 10 includes adhesive supply 12 which delivers adhesive to coating device 14. Coating device 14 delivers adhesive through line 16 to coating die 18. Thin adhesive layer 20 is applied onto repeatably reusable transfer surface 22 of rotating drum 24 by coating die 18. Rotating drum 24 is enclosed within electron beam apparatus 30. Electron beam source 26, enclosed within electron beam apparatus 30, supplies accelerated electrons to irradiate adhesive layer 20 to chemically modify adhesive layer 20. Substrate supply roll 40 unwinds as substrate 42 moves toward nip roller 46. Adhesive layer 20 contacts substrate 42 in a nip formed between nip roller 46 and rotating drum 24, after adhesive layer 20 is exposed to electron beam radiation. Irradiated adhesive layer 20 is transferred from rotating drum 24 to substrate 42. Substrate 42 then carries adhesive layer 20 away from the nip point, resulting in adhesive coated web 50, which can be slit into tape.

Adhesive can be continuously coated upon repeatably reusable transfer surface 22 of rotating drum 24 and continuously transferred to substrate 42 when a continuous manufacturing process is desired. Alternatively, intermittent adhesive coating may be used in an otherwise continuous system to eventually produce adhesive patches of desired size on substrate 42.

Figure 2:
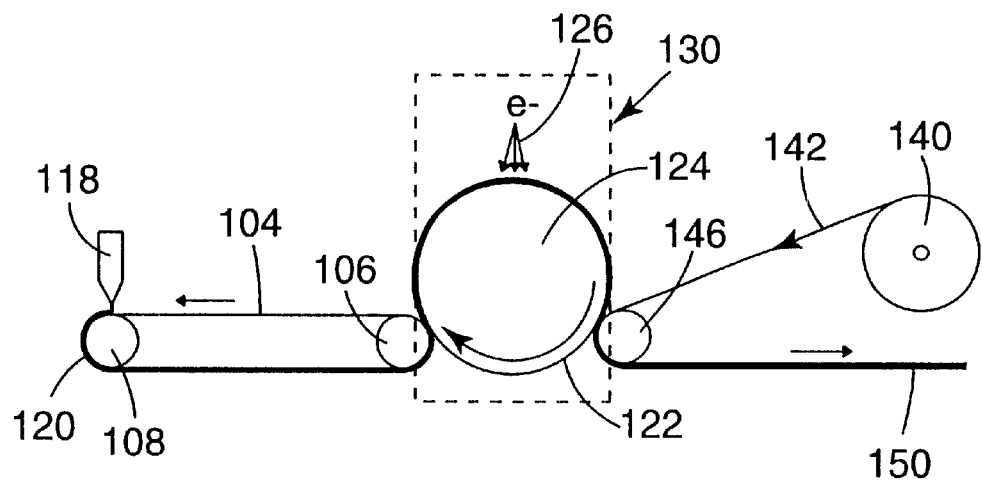
FIG. 2 is a schematic of another embodiment of a method of the present invention.

Referring now to FIG. 2, adhesive coating die 118 applies a layer of adhesive 120 onto release surface 104 which is depicted as a belt moving between nip roller 106 and roller 108. Adhesive 120 is then applied to repeatably reusable transfer surface 122 of rotating drum 124 in a nip formed between nip roller 106 and rotating drum 124 to move the adhesive through electron beam apparatus 130 which includes electron beam source 126 that irradiates the adhesive layer to chemically modify adhesive layer 120. Substrate supply roll 140 unwinds as substrate 142 moves toward nip roller 146. Adhesive layer 120 contacts substrate 142 in a nip formed between nip roller 146 and rotating drum 124, after adhesive layer 120 is exposed to electron beam radiation. Irradiated adhesive layer 120 is thereby transferred from repeatably reusable transfer surface 122 of rotating drum 124 to substrate 142. Substrate 142 then carries adhesive layer 120 away from the nip point, resulting in adhesive coated web 150, which can be slit into tape.

Adhesive can be continuously coated upon release surface 104 and continuously transferred to substrate 142 when a continuous manufacturing process is desired. Alternatively, intermittent adhesive coating may be used in an otherwise continuous system to produce adhesive patches of desired size on substrate 142.

Satisfactory transfer from the release surface to the transfer surface is achieved when any residual of the adhesive material that may be left on the release surface is insufficient to result in an unsatisfactory coating quality or thickness variation in the adhesive that moves to the transfer surface. Factors that affect satisfactory transfer include the temperature of the release surface, temperature of the transfer surface, adhesive temperature, temperature of the rollers, line speed, adhesive composition, percent contact area between the adhesive and transfer surface, etc. These operating parameters should be selected to obtain correct rheology of the adhesive composition for the intended operation.

The electron beam modifiable adhesive layer may be coated into a layer of desired thickness by various coating methods including solvent casting, latex casting, calendering, extrusion coating or hot melt coating. The coating may be applied directly to a repeatably reusable transfer surface, as shown in FIG. 1. Alternatively, the coating may be applied to a release surface for subsequent application to a repeatably reusable transfer surface as illustrated by FIG. 2. Drying or modifying the temperature of the electron beam modifiable adhesive layer can change its cohesive strength and tack and therefore enhance the ease of subsequent transfer step(s). Useful drying techniques are known in the art and determined by the method used to apply the adhesive to the release surface or transfer surface as well as the initial adhesive composition. Temperature modification can be done by techniques known in the art, including exposure to ambient, blown, or cooled gas, infrared heaters, and contact with a temperature controlled roll.

An adhesive may also be applied first to a release surface and then transferred to a repeatably reusable transfer surface. The release surface may be a surface of a drum or a continuous belt. The release surface and the process conditions are selected so the electron beam modifiable adhesive layer, when in contact with both the release surface and the repeatably reusable transfer surface, preferentially adheres to the transfer surface under the chosen process conditions. The release surface can comprise such low surface energy materials as silicones, fluorinated polymers, long chain urethane or acrylic polymers.

The repeatably reusable transfer surface receives the electron beam modifiable adhesive layer from either a release surface or from a coating device, transports the adhesive layer to an irradiation zone of an electron beam apparatus where the adhesive is exposed to electron beam radiation, and then transports the electron beam modified adhesive layer to a location where the electron beam modified adhesive layer is transferred to a substrate. The repeatably reusable transfer surface is selected from the group consisting of an ordered structured surface, a random structured surface, and a smooth surface. It may also include a temperature controllable surface. While FIGS. 1 and 2 include the repeatably reusable transfer surface on a rotating drum, the transfer surface may be an elongated band or belt.

A smooth transfer surface contacts the adhesive over substantially all of its surface extent and may have surface structure or pattern features of a depth no greater than 1 μm. Such a transfer surface may adhere readily to an electron beam modifiable adhesive layer. The adhesive is coated upon the smooth transfer surface or is transferred from a release surface to the transfer surface. Then the adhesive is irradiated before transferring the adhesive to the substrate. However, adhesives generally adhere both to the materials useful as transfer surfaces as well as to the materials useful as substrates, making the subsequent transfer operation difficult. This problem can be solved by changing the adherence of the adhesive to the transfer surface by either controlling the contact area between the adhesive and the transfer surface or modifying the temperature of the transfer surface, or a combination thereof.

One preferred transfer surface comprises a repeating structured or patterned surface effective to reduce surface contact between the transfer surface and the adhesive. The pattern may be raised above the general surface level of the repeatably reusable transfer surface or recessed into it, and it may be open or closed.

Open patterns allow air to bleed out from between the adhesive layer and the patterned transfer surface. Examples of open patterns are parallel rows of lines separated by "V" shaped groves, where the lines are usually at various angles relative to each other, rows of recessed pyramids, and rows of cylindrical polygons.

Figure 3:
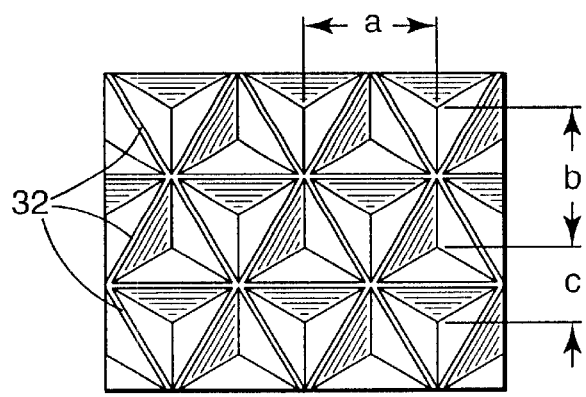
FIG. 3 illustrates one structured surface pattern useful in a method of the present invention.
Figure 4:
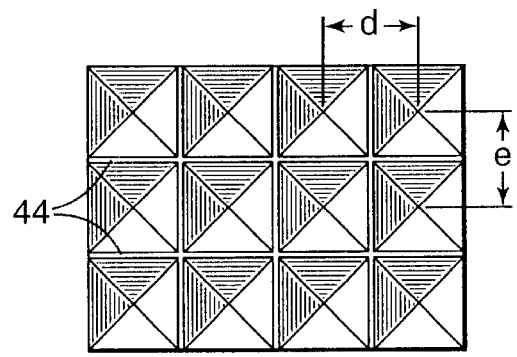
FIG. 4 illustrates another structured surface pattern useful in a method of the present invention.
Figure 5:
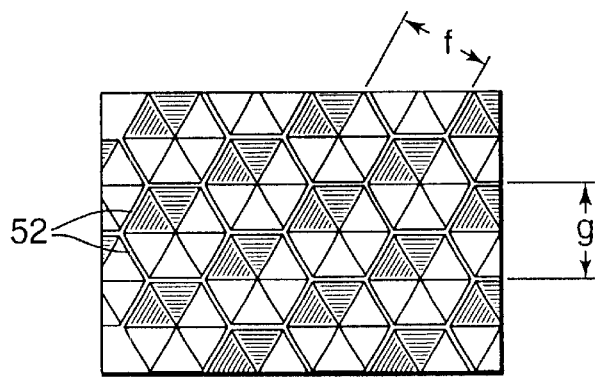
FIG. 5 illustrates yet another structured surface pattern useful in a method of the present invention.

Closed patterns generally trap air between the adhesive layer and the patterned transfer surface so air cannot bleed out from under the adhesive. Examples of closed patterns are polygons recessed beneath the transfer surface separated by lands on the transfer surface. The lands may be continuous or discontinuous. FIG. 3 shows a triangular pattern recessed beneath the general surface level of the repeatably reusable transfer surface. Lands 32 form a triangular pattern on the transfer surface that supports the adhesive and separates the recessed polygons. Center to center distances a, b, and c define the dimensions between the center of each recessed polygon and the next adjacent recessed polygon. The center to center distances between two or more adjacent recesses may be the same or different. FIG. 4 shows a cube corner pattern recessed beneath the general surface level of the repeatably reusable transfer surface. Lands 44 form a square pattern on the transfer surface. Center to center distances d and e are equal for the square pattern illustrated. FIG. 5 illustrates a recessed hexagon pattern with lands 52 and center to center distances f and g.

Air bleed patterns may include a combination of both closed and open patterns, for example a closed pattern wire screen over an open pattern such as a sand blasted surface or a parallel grooved surface. The pattern recesses can be very deep, relative to the adhesive thickness, because the adhesive is preferably supported by the land surface and contact with the depths of the pattern features can make transfer to the substrate more difficult.

Adhesive surface area of contact with the transfer surface varies with process conditions and adhesive compositions, preferably from about 10 to 80% of the adhesive surface area. Higher surface contact levels are possible with lower tack adhesives, and process temperatures placing the adhesive rheology in a lower tack region. Satisfactory transfer of an adhesive layer from a release surface to a patterned transfer surface occurs at room temperature with preferably at least 10% (more preferably 20%) of the adhesive surface area in contact with the patterned transfer surface. Satisfactory transfer of the adhesive to a substrate from the transfer surface occurs at room temperature if there is preferably less than about 80% (more preferably less than about 60%) of the adhesive surface area in contact with the patterned transfer surface. A preferred ordered transfer surface comprises a layer having a multiplicity of structured recesses with structure depths sufficient to prevent the unmodified adhesive from wetting a sufficient area of the recess to adversely hinder subsequent transfer to a substrate (e.g., substrate 42). The preferred structured recesses have structure center to center distances (i. e., the distance from the center of one recess to the center of the next adjacent recess) sufficiently close to support the adhesive on the transfer surface and to prevent excessive sag of the adhesive layer into the pattern recesses. Excessive sag reduces the contact area between an irradiated adhesive and a substrate, inhibiting effective transfer. More specifically, the preferred depth of the recesses ranges from about 1 to 2000 μm (more preferably 100 to 1000 μm) and the structure center to center distances between about 50 and 6000 μm (more preferably 200 to 2000 μm). Thus, structured transfer surfaces range from virtually smooth to macroscopic patterns. Structured surfaces can be made by any method known in the art including, for example, electroforming, embossing, etching, machining, molding, or sandblasting.

The preferred degree of contact changes with the adhesive composition. If the adhesive sags or flows into the pattern recesses, satisfactory transfer of the adhesive layer to the substrate surface may be detrimentally affected. Sagging is influenced by the stiffness of the adhesive, the width of the recesses of the pattern, and the width of the land areas between the recesses of the pattern. Reducing the temperature or changing the composition can increase the adhesive stiffness. Generally, the width of the recesses in the pattern at room temperature should be less than about 2.0 millimeters (mm), preferably less than 1.5 mm, and most preferably less than 0.6 mm. For example, if the pattern were a screen, the mesh openings should be less than about 2.0 mm, preferably less than 1.5 mm, and most preferably less than 0.6 mm.

In addition, a pattern with sufficiently wide land area for surface contact can behave as a smooth transfer surface. Such a pattern could retain residue from the adhesive after the transfer of the adhesive to the substrate surface, or even prevent transfer. At room temperature, the greatest width of the pattern lands for adhesive surface area contact should generally be less than 240 μm, preferably less than 130 μm, and more preferably less than 76 μm. A pattern with wide land areas for surface contact may also be treated as a smooth surface as noted above.

Another preferred transfer surface is a smooth surface that is either heated or cooled to achieve required tackiness of the adhesive when coating upon or transferring from the release surface to the transfer surface and from the transfer surface to the substrate. A temperature controllable surface allows various options in heating and cooling the transfer surface to match the adhesive properties at various temperatures in order to facilitate application of the adhesive to the transfer surface and then to the substrate. One option is cooling hot adhesive after applying the adhesive to the transfer surface with additional cooling after electron beam exposure, so the transfer surface may be relatively cool when the adhesive is applied to the substrate. Another option is heating the adhesive to a lower tack level at the transfer surface to preferentially adhere the adhesive layer to a relatively cool substrate and permit satisfactory transfer to the substrate surface. Thus, the process conditions are adapted for the rheology of the adhesive composition. Examples of means for obtaining controlled differences in temperatures between the two surfaces of the adhesive layer include: heated or cooled nip rolls; infrared lamps; and heated or cooled gas blowers.

Adhesive may fill in the structures in the repeatably reusable transfer surface when applying adhesive directly to that surface. Casting an adhesive film then dropping this film onto the surface, using a temperature controllable transfer surface, using a smooth transfer surface, or combinations thereof are therefore preferred for the direct adhesive application methods.

The transfer surface may be designed to permit variable pressure to contact the adhesive layer. A reduced pressure can help transfer adhesive from the release surface to the transfer surface. Reduced pressure could be generated, for example, by creating a partial vacuum behind a perforated transfer surface in a region where adhesive on the release surface contacts the transfer surface. Increased pressure can force the adhesive from one surface onto another surface. An increased pressure could be generated, for example, by creating a higher pressure region behind a perforated transfer surface where the adhesive contacts the substrate and is transferred thereto. This is more desirable when low adhesion substrate surfaces are used. Such substrates include release liners useful in transfer tape constructions, open weave fabrics, and loose nonwoven webs.

The transfer surface may be a continuous belt or drum or may be a sleeve that is placed on or around a continuous belt or drum. The repeatably reusable transfer surface is resistant to degradation under electron beam irradiation so it may be exposed to the electron beam preferably at least 5 times (more preferably 50 times). Suitable materials, which are known to be resistant to electron beam degradation, include ceramics and metals, such as stainless steel, chrome, copper, nickel, brass, and aluminum.

The adhesive typically comprises one or more electron beam modifiable elastomers and optionally one or more tackifying resins. The electron beam modifiable adhesive layer is selected from the group consisting of acrylics, natural rubbers, polybutadienes, polyisoprenes, styrene/butadiene copolymers, styrene isoprene copolymers, and silicones. The adhesive may also contain one or more additives such as antioxidants, crosslinking agents, fillers, pigments, plasticizers, and UV stabilizers. The adhesive may be pressure sensitive, having a composition that is tacky at the use temperature and that adheres with finger pressure. The thickness of the adhesive layer useful in the present invention covers the range commonly used in the industry and is generally between about 15 $\mu$m and 1000 $\mu$m.

An electron beam apparatus includes an electron beam source that directs electrons into an electron beam modifiable material. The electron beam apparatus provides a typical dose of 5 to 100 kiloGray (kGy) (0.5 to 10.0 MRad) with electrons under an accelerating potential of 30 to 300 kilovolts (kV). The electron beam source may be any electron beam source that emits electron beam radiation sufficient to achieve a desired degree of modification in an electron beam modifiable adhesive layer. The electrons travel from the electron beam source, which is maintained in a vacuum, through an electron beam window into an air gap between the window and the adhesive to be irradiated. The air gap is usually maintained at about atmospheric pressure. The exposure frequently occurs in an inert atmosphere but can occur in air or in a vacuum depending on the composition of the electron beam modifiable adhesive used. Then the electrons travel through the adhesive toward a metal surface, such as the repeatably reusable transfer surface. Manufacturers of suitable electron beam radiation sources include Energy Sciences Inc., in Wilmington, Mass., and RPC Industries, in Hayward, Calif.

Figure 6:
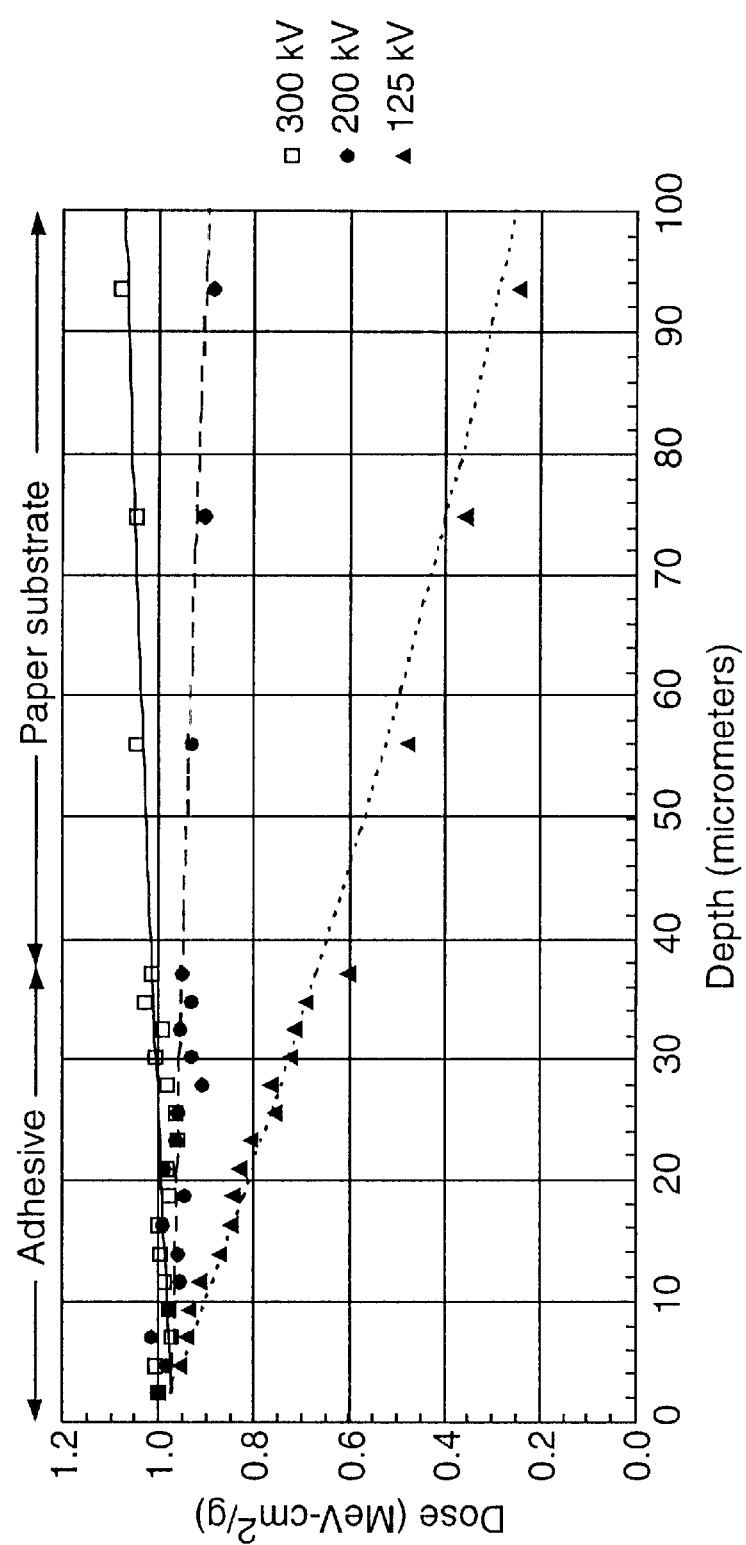
FIG. 6 is a graph illustrating the effect of various accelerating potentials on typical electron beam depth dose curves through a typical adhesive layer and substrate.

Radiation exposure can be varied over the cross-section of an adhesive layer without degrading a substrate because radiation exposure occurs before the adhesive layer is applied to the substrate according to the present invention. When the radiation is applied after the adhesive has been coated on a substrate using the conventional process, the dose received by a typical adhesive layer thickness of 38.1 $\mu$m (1.5 mil) and the dose received by a typical paper substrate for various accelerating potentials is shown in FIG. 6. At an accelerating potential of 125 kV, the dose received by a front surface of the adhesive layer is greater than that received by a back surface of the adhesive that is adjacent to the substrate. At 200 kV, the dose is substantially the same throughout the adhesive layer thickness. At 300 kV, the dose is lower at the front surface of the adhesive than at the back surface. For all three profiles, the adhesive is irradiated while it is in contact with (i.e., immediately adjacent or touching) the substrate with the adhesive layer between the electron beam source and the substrate. At least some irradiation passes through the adhesive and into the substrate. In contrast, the inventive process electron beam modified adhesive layer is subsequently transferred to a substrate, reversing the dose profile of the conventional process so that the adhesive surface nearest the electron beam source becomes the interface between the adhesive and the substrate.

In order to achieve a sufficient electron beam dose to crosslink an adhesive layer at an interface with a substrate by a conventional process, some penetration by electrons into the substrate necessarily occurs. This penetration may cause electron beam modification of the substrate. A typical energy deposition profile or depth-dose curve (i.e., the energy absorbed by each material in the electron beam path) usually reaches a peak in the window and air gap regions or in the adhesive or substrate regions. A square-wave energy deposition curve, such that the adhesive layer receives a similar dose throughout its thickness while the substrate receives no energy, is not physically possible. Thus, when irradiating adhesive on a substrate in a known process, the substrate is exposed to electron beam radiation that may graft the adhesive to the substrate, but the radiation may also cause degradation in the substrate, such as indicated by a reduction in mechanical flexibility. If a liner is used as a carrier material for the adhesive instead of the intended substrate, then removal of the adhesive from the liner is affected by adhesion between the adhesive and the release surface as a result of irradiation that can graft the materials together. This also results in an extra manufacturing step and wasted material when the carrier material is discarded.

The present invention avoids these problems and offers further process advantages. By controlling the dose and accelerating voltage, the electron beam modified adhesive layer may have an electron beam modification profile selected from the group consisting of an increasing degree of crosslinking through the adhesive thickness from a surface toward the substrate, a substantially uniform degree of crosslinking through the adhesive thickness, a decreasing degree of crosslinking through the adhesive thickness, and a peak level of crosslinking within the adhesive between the surface and the substrate. These profiles can be accomplished while the resulting construction of adhesive and substrate has a mechanical flexibility that is not substantially different from the flexibility of a construction having no electron beam modification, as measured by the number of bending cycles to break the construction using the MIT Folding Endurance Test described below.

Reflection of electrons off a metal surface, called backscatter, increases with the accelerating voltage and with increasing atomic number of the metal in the surface. Backscatter can be used advantageously to control the depth/dose gradient, and to achieve a peak level of crosslinking within the adhesive thickness.

Further modification of the depth/dose curve through the adhesive may be achieved by selecting an electron beam window of lower density and/or lower thickness, and by selecting a smaller air gap between the electron beam window and the adhesive, such that voltages of less than 100 kV may be used. These attributes reduce the unit path thickness of the electron beam operation. "Unit path thickness" means the product of thickness times the density for a given combination of materials in the electron beam path. The density and thickness of each material in the path of an accelerated electron can be converted to an equivalent cross-section. For example, if a 300 kV electron can adequately penetrate a material having a density of 1.0 gram per cubic centimeter (g/cc) and a thickness of 500 µm, it can penetrate a material having a density of 0.5 g/cc and a thickness of 1000 µm or a material having a density of 2.0 g/cc and a thickness of 250 µm. Useful electron beam windows include aluminum, beryllium, boron nitride, silicon, silicon nitride, titanium, and polymeric films such as polyimide films. When a polymeric film is used, a protective layer is placed on at least one surface of the film in order to improve performance and durability. The protective layer may be a thin layer of aluminum or other metal that provides protection against free-radical degradation and enhances thermal and electrical conduction along the film.

The smaller unit path thickness of a thinner or lower density electron beam window and narrower air gap of only a few millimeters allows the peak in the depth-dose curve to be shifted into the thickness of the adhesive. This causes the level of crosslinking within the body of the adhesive to be higher than either the crosslinking level at the front or rear surface.

The substrate may be any common paper or film presently known in the art. Examples of such substrates include, for example, metal foils, metal coated polymeric films, polymeric films, paper, creped paper, cloth or non-wovens, and release coated papers and films. However, greater advantages are achieved with the present invention when the selected substrate is radiation degradable because the substrate is not irradiated by an electron beam with the present invention. A preferred radiation degradable substrate is selected from the group consisting of cellulose-based non-woven fabrics, cellulose-based woven fabrics, paper, polyisobutylene films, polypropylene films, polypropylene-based nonwovens, polytetrafluoroethylene films, vinyl films, and combinations thereof. The substrate surface is preferably in web form.

One embodiment of the present invention is an adhesive coated web in which the substrate has no electron beam radiation modification and no electron beam radiation degradation, both as described hereinabove. The adhesive also contains no substantial quantity of chemical, thermal, or ultraviolet crosslinking agent and is preferably pressure sensitive. The adhesive can be attached to the substrate, and in contact with (i.e., immediately adjacent or touching) a radiation degradable component of the substrate, so that the bond between the adhesive and the substrate is stronger than a subsequent bond between the adhesive coated web and a work piece. The adhesive preferably has a cohesive strength greater than the strength of the subsequent bond. Preferably, the adhesive is permanently attached to the substrate.

Alternatively, the adhesive can be separably attached to the substrate so that the bond between the adhesive and the substrate is weaker than a subsequent bond between the adhesive coated web and a work piece. This can be achieved by including a release coating on one or both major surfaces of the substrate. A substrate having a functionally different release level on each major surface allows the surface of the substrate with a higher release level to preferentially adhere to the adhesive, to remove the adhesive from the transfer surface. Then, this differential release substrate may be rolled upon itself This results in an adhesive transfer tape that allows the adhesive to be transferred to a workpiece by adhering the tape construction to the workpiece and then removing the differential release substrate, leaving only the adhesive on the workpiece. The exposed surface of the transferred adhesive is then available to bond the workpiece to another object. Typical release coatings graft to electron beam modified adhesives during the irradiation process making adhesive transfer tapes with electron beam modified adhesives unknown to the art. However, with techniques such as the temperature and pressure assisted transfer described herein, such tape constructions are now possible.

The adhesive can have a patterned surface (i.e., a network of lines on the surface in a visible pattern). Such a pattern may closely or roughly replicate any pattern found on the repeatably reusable transfer surface.

This invention is useful for electron beam radiation crosslinking adhesives that are included in tape constructions having radiation degradable backings. The inventive method permits manufacturing constructions that take advantage of the electron beam process without the adverse substrate effects that are commonly associated with electron beam radiation. More specifically, this allows extrusion coating adhesives having relatively lower molecular weight, then building up the adhesive shear strength through electron beam radiation crosslinking. Inexpensive tape backings that are typically radiation degradable can then be used with no loss in flexibility. Such a method also permits the manufacture of a variety of electron beam modified adhesive transfer tapes.

Objects and advantages of this invention are further illustrated by the following examples, but the particular materials and amounts thereof recited in these examples, as well as other conditions and details, should not be construed to unduly limit this invention.

Percent Wetted Contact

The adhesive was laminated to a structured surface with a specific pattern and the pattern/adhesive assembly was photographed under a microscope with reflected light to determine the percent contact area between the adhesive and the pattern. The contact area was distinctly white under magnification whereas all other areas were translucent. The percent area contact was calculated by dividing the contact area of one region by the total area of that region.

MIT Folding Endurance

A 125 mm wide strip was cut from an adhesive layer on a substrate. The strip was clamped in a Flex Tester MIT Model #1 (from Tinius Olsen Testing Machine Co., Willow Grove, Pa.). The tester repeatedly bent the strip 270° until the strip broke. The number of cycles until break was recorded as a measure of the practical strength.

Adhesion to Substrate

Adhesive tape samples 1.25 centimeters (cm) wide and 15 cm long were tested for adherence to the substrate. A strip was cut from the sample construction to be tested, placed together adhesive-to-adhesive with a strip of a second and different reference adhesive tape, in which the adhesion of the adhesive to substrate was necessarily stronger than the expected adhesion of the tested adhesive to its substrate. The test samples and reference tapes were adhered to each other by rolling them under the pressure of four passes of a 2.1 kg (4.5 lb.) roller. After aging at ambient temperatures (about 22° C.) for approximately one hour, the tapes were peeled apart using a Model 3M90 slip/peel tester (from Imass, Inc., Accord, Mass.) in 180° geometry at 230 cm/min. (90 in./min.) peel rate to determine the force needed in N/dm to separate the adhesive of the sample from its substrate.

EXAMPLES

Transfer Surfaces: Examples 1–11

In Example 1, an adhesive was prepared with 55 parts (by weight) Standard Malaysian Rubber (SMR) CV 60 natural rubber (available from Lewis & Peat, Middlebury, Conn.), 55 parts aliphatic olefin tackifying resin (Escorez™ 1304, available from Exxon Chemical Co., Houston, Tex.), 45 parts styrene-butadiene random copolymer rubber (Synpol™ 1011 A, available from Ameripol Synpol Corp., Akron, Ohio), and 1.1 parts antioxidant (Irganox™ 1010, available from Ciba-Geigy Corp., Hawthorne, N.Y.). The adhesive was die coated at a 38 μm (1.5 mil) thickness onto a silicone release liner. Another release liner was placed on the exposed adhesive and then the assembly was wound for later use.

The second release liner was removed from a sample of the adhesive. This adhesive sample was then laminated onto a transfer surface having Pattern A, shown in FIG. 3 with the dimensions included in Table 1. The lamination force was 45 N (10 lb.), provided by a 38 mm (1.5 in.) diameter 50 mm (2 in.) wide rubber roller. The percent wetted contact (adhesive surface area contacting the pattern) was determined using an optical microscope.

The adhesive was transferred to a saturated paper masking tape substrate by wrapping a 2.5 cm (1.0 in)×11.9 cm (4.7 in) sheet of the 127 μm (5 mil) thick substrate around the rubber roller, rolling the substrate wrapped roller over the adhesive at approximately 1.0 m/sec with approximately 45 N (10 lb.) force. A visual determination was made as to the reliability and completeness of transfer. The data is shown in Table 2.

The transferred adhesive of Example 2 was as in Example 1, except the adhesive was laminated to the pattern with 178 N (40 lb.) force instead of a 45 N (10 lb.) force, resulting in a different percent wetted contact than obtained in Example 1. The percent wetted contact was determined and a visual determination was made as to the reliability and completeness of transfer. The data is shown in Table 2.

The transferred adhesives of Examples 3–11 were as the Examples 1–2, except different patterns, resulting in different percent wetted contact were used. The transferred adhesives of Examples 10–11 were like Example 1, except a smooth pattern, resulting in essentially complete wetted contact, was used and the lamination was done at room temperature for Example 10 and 120° C. for Example 11. The pattern type, lamination force, wetted contact percent, and visual assessments of the transfer of the adhesive layer to the substrate are listed in Table 2. Patterns A and D are shown in FIG. 3. Patterns B and C are shown in FIG. 4. Pattern E is shown in FIG. 5.

TABLE 1

Surface Contact for Various Patterns

| Pattern Type | Ex. | Pattern Shape | Surface Contact Width μm (mil) | Pattern Dimensions: Base μm (mil) | Pattern Dimensions: Depth μm (mil) |
| --- | --- | --- | --- | --- | --- |
| A | 1, 2 | Recessed Triangle | 40.6, 81.3 (1.6, 3.2) | 1680, 1720, 1958 (66.1, 67,7, 77.1) | 711 (28) |
| B | 3, 4 | Recessed Cube Corner | 66.0 (2.6) | 866, 866 (34.1, 34.1) | 533 (21) |

TABLE 1-continued

Surface Contact for Various Patterns

| Pattern Type | Ex. | Pattern Shape | Surface Contact Width μm (mil) | Pattern Dimensions: Base μm (mil) | Pattern Dimensions: Depth μm (mil) |
|---|---|---|---|---|---|
| C | 5, 6 | Recessed Cube Corner | 61.0 (2.4) | 584, 584 (23, 23) | 356 (14) |
| D | 7, 8 | Recessed Triangle | 55.9, 25.4 (2.2, 1.0) | 411, 411, 467 (16.2, 16.6, 18.4) | 178 (7.0) |
| E | 9 | Recessed Hexagon | 240 (9.5) | 2057 (81) | 2057 (81) |
| F | 10, 11 | Smooth | Flat surface | Flat surface | Flat surface |

The adhesives in Examples 1–11 were not irradiated because it was determined that irradiation was not necessary to evaluate the transfer viability of the various patterns.

TABLE 2

Transfer Quality Rating of Various Patterns

| Ex. | Pattern Type | Lamination Force N (lb.) | Temp. of Transfer Surface (° C.) | Percent Wetted Contact | Transfer Quality Rating Release-to-Transfer Surface | Transfer Surface-to-Surface |
|---|---|---|---|---|---|---|
| 1 | A | 44.5 (10) | 22 | 11.5 | Fair | Good |
| 2 |   | 178 (40) |   | 14.2 | Fair | Good |
| 3 | B | 44.5 (10) | 22 | 14.8 | Fair | Good |
| 4 |   | 178 (40) |   | 17.3 | Good to Fair | Good |
| 5 | C | 44.5 (10) | 22 | 20.2 | Good | Good |
| 6 |   | 178 (40) |   | 22.5 | Good | Good |
| 7 | D | 44.5 (10) | 22 | 24 | Good | Good |
| 8 |   | 178 (40) | 22 | 35 | Good | Good to Fair |
| 9 | E | 44.5 (10) | 22 | 13.0 | Fair | Fair to Poor |
| 10 | F | 44.5 (10) | 22 | 100 (Smooth) | Good | Poor |
| 11 |   | N/A | 120 | 100 | N/A | Good |

Good = Completely and cleanly transferred
Fair = Some incomplete or flawed transfer but acceptable
Poor = Failure to transfer at all The hexagonal pattern in Example 9 had borders 240 μm (9.5 mil) wide and a relatively low surface contact of 13%. The transfer of the adhesive to the substrate was marginally satisfactory at room temperature because the adhesive sagged into the recessed pattern and did not contact the substrate enough to ensure good transfer. Also, the large supported contact area at the pattern borders did not transfer readily due to the essentially complete adhesive contact in that local area. This indicated that the local contact width and the spacing between contact areas was important even when the total percent wetted contact was at the lower end of the range.

Generally, the transfer from the release surface to the drum transfer surface was made easier by contact areas at the higher end of the range with a smooth drum providing the easiest transfer. Transfer from the drum to the substrate was made easier by contact areas on the low end of the range, from about 10 to 20 percent wetted contact area. For the adhesion and release properties for the adhesive, release liner, and substrate used in this series of examples, the acceptable range of wetted contact at room temperature was between about 10 and 40 percent. The upper limit of the range increases to about 80 to 100 percent wetted contact area when the transfer surface was heated. Thus many patterns were possible at room temperature, and the pattern possibilities increased when the transfer surface temperature was controlled.

Substrate Degradation: Comparative Examples C1–C10, Examples 12–13

In Comparative Example C1, a rubber based adhesive was formulated with 55 parts (by weight) SMR CV 60 natural rubber, 50 parts aliphatic olefin tackifying resin (Escorez™ 1304), 45 parts styrene-butadiene random copolymer rubber (Synpol™ 1011A), 2.0 parts titanium dioxide, 1.0 parts antioxidant, 1.5 parts linear low density polyethylene (Dowlex™ 6806, available from Dow Chemical Co., Midland, Mich.), and 1.5 parts styrene-isoprene-styrene (SIS) block copolymer (Kraton™ 1107, available from Shell Chemical Co., Houston, Tex.).

The adhesive was die coated with a die coater at a thickness of 58 μm (2.3 mil) onto a continuous silicone release belt (No. 2015 from Voss Belting of Lincolnwood, Ill.). The release belt passed over a temperature controlled driven backup roller maintained at 30° C. at 15.2 m/min (50 feet per minute (fpm)). The adhesive layer on the silicone belt passed through an entrance slot into the lead lined chamber of the electron beam exposure unit (described above) while the electron beam source power was off, and placed in contact with a nickel transfer surface having Pattern B (described in Table 1 and illustrated in FIG. 4). This transfer surface was in the form of a sleeve over a driven drum with a diameter of 460 mm (about 17 in.) that was maintained at room temperature (about 22° C.). Two successive nip rolls held the release belt against the drum transfer surface for more than twice the time and area provided by one of the nip rollers. The adhesive layer was pressed onto the transfer surface with 89 N (20 lb.) force by these nip rollers. The adhesive layer transferred cleanly to the transfer surface and then passed under the electron beam source which was turned off. A paper masking tape substrate was routed into the electron beam chamber through a slot on the side of the chamber after (or downstream of) the irradiation zone (i.e., the part of the chamber in which the electron beam radiation is directed toward a work piece or substrate). The adhesive layer was placed in contact with the surface of this substrate by two successive nip rolls behind the substrate. These two nip rolls increased the time of adhesive contact and the area of adhesive under pressure, when compared to a single nip roll. The nip rolls each pressed the adhesive layer onto the paper masking tape substrate surface with a force of 89 N (20 lb.).

The adhesive layer was transferred cleanly to the paper masking tape substrate surface, wound up into a roll, and subsequently unwound and tested for backing flexibility as per the MIT Folding Endurance Test, the average value of five tests of which are reported in Table 3.

The adhesive tape constructions of Comparative Examples C2–C10 were made as in Comparative Example C1, except that the resulting adhesive tape rolls were then passed straight through the electron beam exposure unit with the electron beam source power on. The drum transfer surface was bypassed, such that the adhesive layer would be irradiated while in contact with the paper masking tape substrate. The electron beam was adjusted to irradiate the top surface of the adhesive layers at various accelerating potentials with various doses as listed in Table 4. The webs were then rolled up and subsequently unwound and tested for backing flexibility as per the MIT Folding Endurance Test, the average value of three tests of which are reported in Table 3.

The adhesive tape constructions of Examples 12–13 were made as in Comparative Example C1, except that the electron beam exposure unit was on and adjusted to irradiate the top surface of the adhesive layers at an accelerating potential of 200 kV with various doses as listed in Table 3. The webs were then rolled up and subsequently unwound and tested for backing flexibility as per the MIT Folding Endurance Test, the average value of three tests of which are reported in Table 3.

TABLE 3

Folding Endurance

| Example | Potential kV | Dose kGy | MIT Folding Endurance Average Cycles | Percent Reduction in Folding Endurance |
|---|---|---|---|---|
| C1 | 0 | 0 | 730 | Baseline |
| C2 | 125 | 40 | 746 | −2 (increase) |
| C3 | 125 | 70 | 666 | 9 |
| C4 | 125 | 100 | 619 | 15 |
| C5 | 150 | 40 | 583 | 20 |
| C6 | 150 | 70 | 425 | 42 |
| C7 | 150 | 100 | 315 | 57 |
| C8 | 200 | 40 | 449 | 38 |
| C9 | 200 | 70 | 238 | 67 |
| C10 | 200 | 100 | 131 | 82 |
| 12 | 200 | 40 | 791 | −8 (increase) |
| 13 | 200 | 100 | 792 | −8 (increase) |

Substrate degradation was determined by comparing the average number of folding cycles of each of the examples relative to that samples with little or no irradiation. No substrate degradation was evident in Comparative Examples C1 (no irradiation) or C2 (least severe irradiation). Comparative Examples C2–C10 were irradiated while the adhesive was on the substrate. Electron beam radiation modification and degradation of the Comparative Examples increased in proportion to the exposure levels. Substantial electron beam degradation occurred in Comparative Examples C3 through C10.

In contrast, no electron beam radiation modification and no electron beam substrate degradation was evident in the inventive process (Examples 12–13) in which the adhesive layer was exposed to comparable irradiation conditions, demonstrating the advantage of this invention. Although the irradiation conditions were adjusted to deliver the listed dose to the top surfaces of the adhesive layers, FIG. 6 illustrates that a significant amount of electron beam radiation necessarily reaches the substrate when the adhesive is exposed while in contact with the substrate. Holding the maximum irradiation levels to the least severe conditions limits the substrate degradation in the conventional process, but this also limits the level of crosslinking in the adhesive and limits where the maximum dose can occur within the adhesive layer without significant substrate degradation. The present invention allows virtually any level of adhesive crosslinking and a peak dose anywhere within the adhesive thickness with no substrate degradation.

Adhesion to Substrates: Comparative Examples C11–C13, Examples 14–17

The adhesive layer constructions of Comparative Examples C1 and C12 were made as in Comparative Examples C8 and C10, respectively. The adhesive layer constructions of Examples 14 and 15 were made as in Examples 12 and 13, respectively. The adhesive layer constructions of Examples 16 and 17 were made as in Examples 12 and 13, respectively, except that the irradiated adhesive layer was exposed to an air atmosphere before being transferred to the substrate. Comparative Example C13 was made by coating the adhesive directly onto the paper masking tape substrate with a conventional hot melt die coater at 45.7 μm (1.8 mil) thickness, passing the coated construction at 61 m/s (200 fpm) under the electron beam set at 200 kV to irradiate the surface of the adhesive in a nitrogen atmosphere with a dose of 40 kGy (4 MRad), and winding the construction into a roll. The conditions are listed in Table 4. The constructions were evaluated for adhesion of the adhesive to the substrate. The data is shown in Table 4.

TABLE 4

Adhesion to Substrate

| Example | Dose kGy | Irradiated | Adhesion to Substrate N/dm |
|---|---|---|---|
| C11 | 40 | On Substrate | 60 |
| C12 | 100 | On Substrate | 61 |
| 14 | 40 | Before Transfer, Nitrogen | 60 |
| 15 | 100 | Before Transfer, Nitrogen | 57 |
| 16 | 40 | Before Transfer, Air | 60 |
| 17 | 100 | Before Transfer, Air | 60 |
| C13 | 40 | On Substrate | 58 |

There was no significant difference in the adhesion of the backing to the adhesive whether the adhesive was irradiated before or after lamination to the backing, whether the transfer was performed in a nitrogen or air atmosphere, or whether it was made by a conventional process. The exposure conditions tested included the high end of useful exposures, sufficient to show any differences.

Dose Gradients: Examples 18–20

The adhesive constructions in Examples 18–20 were prepared as in Example 12 using Pattern B except the adhesive thickness was 46 μm (1.8 mil), accelerating potentials were chosen that gave varying dose gradients (and therefore crosslink gradients) through the adhesive. Radiachromic film dosimeters (FWT-60-00, available from Far West Technology, Inc., Goleta, Calif.) were staggered on both sides of the adhesive to be irradiated (never one dosimeter directly above another) and then removed from the tape assembly and read after completion of the process. A Model 92 Radiachromic Reader (available from Far West Technology) was used to determine the dosage received by each dosimeter. The conditions and dosimeter readings are shown in Table 5. The top side of the adhesive layer is defined as the side exposed to the atmosphere and the bottom side is defined as the side adhered to the substrate in the final product.

TABLE 5

Dose Gradients

| Example | Adhesive Side | Accelerating Voltage (kV) | Relative Dose (kGy) |
|---|---|---|---|
| 18 | Top | 125 | 0.18 |
|  | Bottom | 125 | 1.00 |
| 19 | Top | 200 | 1.00 |
|  | Bottom | 200 | 1.00 |
| 20 | Top | 300 | 1.06 |
|  | Bottom | 300 | 1.00 |

The dosimeters were 43 μm (1.7 mil) thick so the exact gradient through the adhesive layer could not be measured using this technique, although a general trend was observed. This indicated a decreasing dose gradient through the adhesive layer at an accelerating potential of 125 kV, a uniform dose gradient through the adhesive layer at an accelerating potential of 200 kV, and an increasing dose gradient through the adhesive at an accelerating potential of 300 kV. This was done without irradiating the backing, something not possible using conventional techniques.

Temperature, Patter, Substrate: Examples 21–27

Adhesive constructions were made for Examples 21–27 as in Example 12, except various drum temperatures (either maintained at 21° C. (70° F.) or heated to 49° C. (120° F.)), transfer surface pattern shapes and depths (Patterns A, B, and C described in Table 1 and shown in FIGS. 3 and 4), substrate types (paper as in Example 12 or 100 μm (4 mil) polyethyleneterephthalate film), and speeds between 6 and 40 m/min (20 and 130 fpm) were used as shown in Table 6. The unmodified adhesive layer of each example transferred cleanly from the release surface to the transfer surface and the irradiated adhesive layer of each example transferred cleanly from the transfer surface to the substrate.

TABLE 6

Temperature, Pattern, and Substrate

| Example | Drum Temperature ° C. | Transfer Pattern Shape | Substrate | Speed m/min (fpm) |
|---|---|---|---|---|
| 21 | 21 | Pattern A | paper | 40 (130) |
| 22 | 21 | Pattern B | paper | 37 (120) |
| 23 | 21 | Pattern B | film | 6 (20) |
| 24 | 21 | Pattern C | paper | 37 (120) |
| 25 | 21 | Pattern C | film | 18 (60) |
| 26 | 49 | Pattern B | paper | 37 (120) |
| 27 | 49 | Pattern C | paper | 37 (120) |

These examples showed that controlling the transfer surface, having various patterns, to ambient and higher temperatures allowed satisfactory transfer of the adhesive before and after irradiation.

Cooled Transfer Surface: Examples 28–29

The pressure-sensitive adhesive constructions of Examples 28–29 were formulated with a composition of 95 weight percent isooctyl acrylate and 5 weight percent acrylic acid that was water emulsion polymerized and had a shear viscosity of 150 Pa-s and was dried. This composition was blended with 1.5 parts polyethylene (Dowlex™ 6806, available from Dow Chemical Co., Midland, Mich.) and 1.5 parts styrene-butadiene rubber (Kraton™ 1107, available from Shell Chemical Co., Houston, Tex.).

The inventive process was run at 6 m/min. (20 fpm). The drum transfer surface was cooled to 4° C. (40° F.) for Example 28 and maintained at 21° C. (70° F.) for Example 29. The unmodified adhesive layer of each example transferred cleanly from the release surface and the irradiated adhesive layer of each example transferred cleanly from the transfer surface to the substrate. These examples showed that controlling the transfer surface to ambient and lower temperatures allowed satisfactory transfer before and after irradiation.

Screen Transfer Surfaces: Examples 30–37

A 50.8 μm (2 mil) thick layer of the adhesive composition used in Examples 12–13 (described above) was die coated onto a silicone release roll and then transferred to a screen belt that contacted the release roll at a nip point. The belt material was 50×50 bronze mesh screen (50 openings per horizontal linear inch and 50 openings per vertical linear inch) (from McMaster-Carr Industrial Supply, Chicago, Ill.). The unmodified adhesive layer was carried by the belt through an entrance slot into the lead lined chamber of the electron beam exposure unit described above and irradiated using an accelerating potential of 175 kV to produce a surface dose of 40 kGy (4 MRad), and then passed from the chamber through an exit slot. The irradiated adhesive layer was placed in contact with the surface of a paper masking tape substrate by a nip roll behind the paper masking tape substrate and a nip roll beneath the belt such that the irradiated adhesive layer was pressed onto the paper masking tape substrate surface with sufficient force to transfer the irradiated adhesive layer to the substrate. The adhesive layer was transferred cleanly to the paper masking tape substrate surface and wound up into a roll.

Other screen configurations (also available from McMaster-Carr) were also tested and the resulting transfer ratings appear in Table 7.

TABLE 7

Screen Transfer Surfaces

| Example | Screen Mesh Size and Material | Transfer Quality Rating |
| --- | --- | --- |
| 30 | 14 × 14 Brass | Poor |
| 31 | 30 × 30 Galvanized Steel | Fair |
| 32 | 40 × 40 Aluminum | Fair to Good |
| 33 | 50 × 50 Brass | Good |
| 34 | 60 × 60 Stainless Steel | Poor |
| 35 | 100 × 100 Brass | Good |
| 36 | 100 × 100 Stainless Steel | Good |
| 37 | 200 × 200 Stainless Steel | Fair to Good |

These examples showed that both the screen mesh size and the screen material were important. While several screen configurations can be used as transfer surfaces, the 50×50 brass was preferred for this adhesive composition and thickness.

Various modifications and alterations of this invention will become apparent to those skilled in the art without departing from the scope and principles of this invention, and it should be understood that this invention is not to be unduly limited to the illustrative embodiments set forth hereinabove.

We claim:

1. An adhesive coated web, comprising:
   a substrate having at least one component susceptible to electron beam radiation degradation selected from the group consisting of cellulose-based non-woven fabrics, cellulose-based woven fabrics, paper, polyisobutylene films, polypropylene films, polypropylene-based nonwovens, polytetrafluotoethylene films, vinyl films, and combinations thereof; and
   an adhesive layer attached to the substrate, so that a bond between the adhesive and the substrate is stronger than a subsequent bond between the adhesive coated web and a workpiece, the adhesive being in contact with a radiation degradable component of the substrate, the adhesive having a electron beam crosslinked composition, containing no substantial quantity of chemical, thermal, or ultraviolet crosslinking agent and having a patterned surface, and wherein the resulting construction flexibility is characterized by MIT Folding Endurance test data showing no decline in number of test cycles at break between said adhesive coated web and a similar adhesive coated web having had no exposure to an electron beam.

2. The web of claim 1, wherein the adhesive is selected from the group consisting of acrylics, natural rubbers, polybutadienes, polyisoprenes, styrene/butadiene copolymers, styrene/isoprene copolymers, and silicones.

3. The web of claim 1, wherein the electron beam modified adhesive composition is a pressure-sensitive adhesive.

4. The web of claim 1, wherein the electron beam modified adhesive layer has an electron beam modification profile selected from the group consisting of an increasing degree of crosslinking through the adhesive thickness from a surface toward the substrate, a substantially uniform degree of crosslinking through the adhesive thickness, a decreasing degree of crosslinking through the adhesive thickness, and a peak level of crosslinking within the adhesive between the surface and the substrate.

5. An adhesive coated web, comprising:
   a substrate having at least one component susceptible to electron beam radiation degradation, having no electron beam radiation modification and having a first major surface with a first release level and having a second major surface with a second release level that is higher than the first release level; and
   an adhesive layer separably attached to the substrate so that a bond between the adhesive and the substrate is weaker than a subsequent bond between the adhesive coated web and a work piece, the adhesive having an electron beam crosslinked composition, containing no substantial quantity of chemical, thermal, or ultraviolet crosslinking agent, and having a patterned surface; and
   wherein the flexibility of said adhesive coated web is characterized by MIT Folding Endurance test data showing no decline in number of test cycles at break between said adhesive coated web and a similar adhesive coated web having had no exposure to an electron beam.

6. The adhesive coated web of claim 5 wherein:
   the substrate is selected from the group consisting of cellulose-based non-woven fabrics, cellulose-based woven fabrics, paper, polyisobutylene films, polypropylene films, polypropylene-based nonwovens, polytetrafluoroethylene films, vinyl films, and combinations thereof, and
   the adhesive layer is selected from the group consisting of acrylics, natural rubbers, polybutadienes, polyisoprenes, styrene/butadiene copolymers, styrenelisoprene copolymers, and silicones, having an electron beam modified composition and containing no substantial quantity of chemical, thermal, or ultraviolet crosslinking agent.

7. The web of claim 5, wherein the electron beam modified adhesive composition is a pressure-sensitive adhesive.

8. The web of claim 5, wherein the electron beam modified adhesive layer has an electron beam modification profile selected from the group consisting of an increasing degree of crosslinking through the adhesive thickness from a surface toward the substrate, a substantially uniform degree of crosslinking through the adhesive thickness, a decreasing degree of crosslinking through the adhesive thickness, and a peak level of crosslinking within the adhesive between the surface and the substrate.

* * * * *

UNITED STATES PATENT AND TRADEMARK OFFICE
CERTIFICATE OF CORRECTION

PATENT NO. : 6,455,152 B1  
DATED : September 24, 2002  
INVENTOR(S) : Dizio, James P.

It is certified that error appears in the above-identified patent and that said Letters Patent is hereby corrected as shown below:

Column 1,  
Lines 59-60, the paragraph beginning with "The adhesive is selected..." should be a part of the previous paragraph.

Column 7,  
Line 58, delete "styrenelisoprene" and insert in place thereof -- styrene/isoprene --.

Column 16,  
Line 25, delete "that" and insert in place thereof -- those --.

Signed and Sealed this

Thirteenth Day of April, 2004

JON W. DUDAS  
*Acting Director of the United States Patent and Trademark Office*

UNITED STATES PATENT AND TRADEMARK OFFICE
CERTIFICATE OF CORRECTION

PATENT NO. : 6,455,152 B1
DATED : September 24, 2002
INVENTOR(S) : Dizio, James P.

It is certified that error appears in the above-identified patent and that said Letters Patent is hereby corrected as shown below:

<u>Title page,</u>
Item [75], Inventors, delete "Bruce A. Sventek, Saint Paul; Charles G. Carter, Oakdale,".

Signed and Sealed this

Twenty-fourth Day of January, 2006

JON W. DUDAS
*Director of the United States Patent and Trademark Office*